US007772552B2

(12) United States Patent
Gribb et al.

(10) Patent No.: US 7,772,552 B2
(45) Date of Patent: Aug. 10, 2010

(54) METHODS AND DEVICES FOR ATOM PROBE MASS RESOLUTION ENHANCEMENT

(75) Inventors: Tye Gribb, Madison, WI (US); Jesse D. Olson, Madison, WI (US); Daniel Lenz, Stoughton, WI (US); Joseph H. Bunton, Madison, WI (US)

(73) Assignee: Cameca Instruments, Inc., Madison, WI (US)

( * ) Notice: Subject to any disclaimer, the term of this patent is extended or adjusted under 35 U.S.C. 154(b) by 230 days.

(21) Appl. No.: 11/629,414

(22) PCT Filed: Jun. 17, 2005

(86) PCT No.: PCT/US2005/021552

§ 371 (c)(1), (2), (4) Date: Oct. 24, 2008

(87) PCT Pub. No.: WO2006/009882

PCT Pub. Date: Jan. 26, 2006

(65) Prior Publication Data

US 2009/0050797 A1 Feb. 26, 2009

Related U.S. Application Data

(60) Provisional application No. 60/581,508, filed on Jun. 21, 2004.

(51) Int. Cl.

| | |
|---|---|
| ***G01N 23/00*** | (2006.01) |
| ***G21K 7/00*** | (2006.01) |

(52) U.S. Cl. ....................... 250/309; 250/281; 250/282; 250/306; 250/307; 250/287; 250/288; 250/491.1; 850/26; 850/63

(58) Field of Classification Search ................. 250/281, 250/282, 306, 307, 309, 287, 288, 491.1; 850/26

See application file for complete search history.

(56) References Cited

U.S. PATENT DOCUMENTS 5,440,124 A * 8/1995 Kelly et al. .................. 850/63

* cited by examiner

*Primary Examiner*—Robert Kim
*Assistant Examiner*—Meenakshi S Sahu
(74) *Attorney, Agent, or Firm*—Craig A. Fieschko, Esq.; DeWitt Ross & Stevens S.C.

(57) ABSTRACT

In an atom probe or other mass spectrometer wherein a specimen is subjected to ionizing pulses (voltage pulses, thermal pulses, etc.) which induce field evaporation of ions from the specimen, the evaporated ions are then subjected to corrective pulses which are synchronized with the ionizing pulses. These corrective pulses have a magnitude and timing sufficient to reduce the velocity distribution of the evaporated ions, thereby resulting in increased mass resolution for the atom probe/mass spectrometer. In a preferred arrangement, ionizing pulses are supplied to the specimen from a first counter electrode adjacent the specimen. The corrective pulses are then supplied from a second counter electrode which is coupled to the first via a passive or active network, with the network controlling the form (timing, amplitude, and shape) of the corrective pulses.

27 Claims, 4 Drawing Sheets

METHODS AND DEVICES FOR ATOM PROBE MASS RESOLUTION ENHANCEMENT

CROSS-REFERENCE OF RELATED APPLICATIONS

The present application is a U.S. National Phase application of PCT/US2005/021552, filed Jun. 17, 2005. This application also claims the benefit of U.S. Provisional Patent Application No. 60/581,508, filed Jun. 21, 2004. The disclosures of both applications are incorporated herein by reference in their entireties.

BACKGROUND OF THE INVENTION

Atom probes are analytical instruments that analyze the atomic-level composition of materials by field evaporation of atoms and small molecules from a specimen, and measuring their time of flight (TOF) from the specimen to a detector some distance away. See, for example, U.S. Pat. Nos. 5,061,850, 5,440,124 and 6,576,900 to Kelly et al.; International Publications WO 99/14793 and WO2004/111604; and Kelly et al., Ultramicroscopy 62:29-42 (1996).

In a typical atom probe, the specimen is in the form of a sharp tip (often having a tip radius of ~50 nm), and is held at a semi-static standing voltage that is below that necessary to cause field evaporation of the atoms at the tip of the specimen. A counter electrode, which usually has an aperture therein, is spaced about or at a slight distance from the specimen tip, with the specimen tip pointing through the aperture. A pulsed (usually negative) voltage is applied to the counter electrode, and/or a pulsed (usually positive) voltage is applied to the specimen, with sufficient magnitude to ionize the specimen tip, preferably a single atom at a time. Ionization usually does not occur with every pulse, and rather occurs once per several pulses (often with one ionization event for every 10-100 pulses). The amplitude of this pulse, called the "ionization pulse," is typically 10% to 25% of the standing voltage.

During the initial stages of analysis the specimen tip rapidly adopts a nominally hemispherical end form, since any atom that is more "exposed" to the ionizing field will be preferentially evaporated. The hemispherical end form of the tip creates an electric field that is nearly radial, and consequently when a specimen atom is ionized, it flies radially away from the specimen, through the aperture of any counter electrode, and toward a 2-dimensional (2D) particle detector (generally located 10-100 mm away from the specimen tip). The position at which the ion impacts the detector is measured, and this impact position is uniquely correlated with the ion's original position on the specimen surface. In this manner the specimen tip (of for example 50 nm size) is effectively projected onto the detector (of for example 40-100 mm size), yielding roughly a million-fold factor of magnification.

Apart from monitoring the ion impact position, time of flight (TOF) mass spectroscopy is performed on the evaporated ions by measuring the time between the application of the ionization pulse (which roughly indicates the time of ion departure from the specimen) and the subsequent ion impact at the detector. The TOF measurement can be directly correlated to the mass to charge ratio (MTC) of the ion, which in turn can allow identification of the ionized atomic (or molecular) species. Thus, by utilizing the magnified "image" of the specimen and the elemental identification provided by the TOF mass spectroscopy, a 3-dimensional atom map of the specimen can be created.

One of the inherent limitations of atom probes is that for a given MTC ratio (i.e., for a particular ionized species), a range of TOF values can be measured. This inherent spread in the TOF measurement limits the ability of atom probe techniques to distinguish between atomic (or molecular) species of nearly the same MTC ratio. In other words, the peaks in the TOF histogram of two different species may overlap, making it difficult to assign a specific MTC ratio to each species, and thereby making it difficult to identify the ions that are recorded in the overlapped region. Thus, there is a limit to the mass resolution (ionic species identification) capability of an atom probe.

A second order effect of the finite mass resolution is decreased sensitivity to low concentration species. All atom probes record spurious events—for example, ionization events that occur independent of ionization pulses, "rogue" species in the atom probe which impact the detector, etc.—that contribute to a finite noise floor. In order for a given species to be definitively identified, it must be present in quantities that are statistically significant compared with the noise floor. The smaller the range in measured TOF, the more quickly a valid signal will emerge from the noise.

One factor reducing the mass resolution in all atom probes that utilize an ionization pulse to initiate field evaporation of specimen ions is the (relatively small) uncertainty in the time of ion departure upon application of the ionization pulse, and the corresponding energy (velocity) that is imparted to the departing ion. This phenomenon is illustrated in FIG. 1, which schematically illustrates an exemplary plot (depicted as voltage versus time) of an ionization pulse at 100. (While the ionization pulse 100 is typically negative and delivered to a counter electrode, it is shown positive in FIG. 1 for clarity.) The rate at which ions field evaporate from a surface has been shown experimentally (in accordance with theory) to be exponentially dependent upon field strength, which is in turn linearly related to the applied voltage.

As a result of the exponential nature of field evaporation, nearly all specimen ion evaporation events occur very near the peak voltage of the ionization pulse 100, with the range $\Delta t$ in FIG. 1 illustrating the time interval over which most ionization occurs. The exact time at which any given atom or molecule is ionized during the ionization pulse 100 is described by the probabilistic distribution shown schematically at 102. The exact width of the distribution 102 varies with many experimental parameters, such as specimen material and temperature. Nevertheless, in all cases, the result is an uncertainty $\Delta t$ in the exact ionization time of any given atom or molecule relative to the time to corresponding to the peak voltage of the ionization pulse 100.

After being ionized, the atoms or molecules are accelerated by the electric field caused by the combination of the standing voltage and the ionization pulse voltage until the ions enter a relatively field-free region just inside the aperture of the counter electrode (if one is present). An atom or molecule that is ionized before the peak of the ionization pulse experiences an increasing field as it is accelerating away from the specimen and will therefore acquire more energy (i.e. velocity) as compared an atom or molecule that is ionized at the same voltage, but after the peak. Thus, there is a range of ion departure velocities, with most ions having velocities varying in the range $\Delta v$ shown in FIG. 1 (which schematically illustrates the velocity distribution of ions at 104 in accordance with their time of ionization).

Therefore, any given atom or molecule that is ionized in an atom probe will have an uncertainty $\Delta t$ in the exact instant of ionization, and in the exact velocity ($\Delta v$) it acquires during and after the ionization process. As a given ion type traverses the distance from the specimen to the detector, the combination of Δt and Δv gives rise to a spread in the measured time of flight. This variation limits the ability to resolve species that have nearly identical MTC ratios. By varying the design of the atom probe, the exact form of FIG. 1 can be altered significantly—for example, the ions leaving early during the ionization pulse may be the slowest—but for a given design the variation in velocity versus the exact instant of ionization will be systematic, and therefore (at least theoretically) correctable.

In practice, it is the velocity distribution Δv that creates the majority of the uncertainty in measured TOF, and consequently limits mass resolution in conventional atom probes. Traditionally, the atom probe and mass spectrometry communities refer to the velocity distribution Δv inherent in atom probes as the "energy deficit," and the process of reducing the spread in the velocity distribution is called "energy compensation". (Additionally, it should be understood that "velocity distribution" usually refers to the distribution of velocities for a particular species of ions evaporated from a specimen, not to the far wider distribution of velocities across all species.) An atom probe without any form of energy compensation will typically possess a mass resolution of 1 part in 80-200 as measured by the full-width at half-maximum (FWHM) of a given mass peak in the spectrum. A variety of energy compensation schemes have been employed, including:

(1) Reflectrons. A reflectron is essentially an electrostatic mirror. Ions from the specimen are directed into the reflectron, where they stopped by a uniform decelerating electrostatic field. The same field then accelerates the ion back out of the reflectron at a small angle to the incident beam. Faster ions penetrate more deeply into the reflectron than slower ions, and therefore spend more time in the reflectron. If the distances between the specimen, reflectron, and detector are carefully chosen, the spread in measured TOP times can be reduced. Mass resolutions of 1 part in 800 (FWHM) have been reported for atom probes with reflectrons. The main disadvantage of reflectrons is that only a small range in the incident angle of incoming ions is properly reflected, limiting the use of the reflectron to 1-D atom probes, and to 3-D atom probes that have a relatively small angle of view.

(2) Post Acceleration. In post acceleration, after the initial ionization event, all of the ions are accelerated to a significantly higher velocity by a constant voltage, known as a post-accelerating voltage, for the remainder of the flight distance to the detector. By increasing the velocity of the ions by a constant voltage, the fraction of the velocity due to the ionization pulse voltage—which is the source of the velocity variation—is minimized, and mass resolution is increased. The main disadvantages to this approach are that the amount of mass resolution improvement is asymptotically limited to a modest amount for reasonable instrument geometries and post acceleration voltages. Experimental results employing this technique suggest that mass resolutions of 1:400 to 1:600 (FWHM) are possible.

(3) 163° Poschenrieder Energy Compensating lens. This technique employs a semicircular ion flight path of 163° created by electrostatic fields to compensate for the differences in ion velocities. A faster ion traverses the semicircular flight path with a slightly larger radius than that of a slower ion, and as a result, it has a longer flight length. If the proper dimensions are calculated—the 163° angle is the result of analytical calculations—the different flight paths/lengths of the ions result in the ions having the same flight times to the detector. Mass resolutions of 1:5000 (FWHM) have been achieved with this technique. The main limitation of this technique is that it destroys information related to ion position, and is therefore limited to 1D atom probes where knowledge of the original positions of the ions on the specimen is not needed.

(4) Ion Deceleration Via a Counter Electrode. This technique is schematically depicted in FIG. 2A, wherein a specimen 200 is shown in an atom probe chamber 202 spaced from a detector 204, and with the specimen 200 being connected to a source 206 of standing voltage. Departing ions (illustrated by flight cone 208) pass in turn through a first counter electrode 210 connected to an ionization pulser 212, and then through a second counter electrode 214 which is well connected to ground 216 (or to some other constant potential equal to the non-pulsed potential of the first counter electrode 210, as depicted in FIG. 2C). When the first counter electrode 210 is pulsed by the pulser 212 to ionize atoms on the specimen 200, the ions traveling to the second counter electrode 214 are all slowed to approximately the same velocity (one corresponding to the non-pulsed potential of the electrodes 210 and 214). This results in a reduction in the spread of the velocity distribution caused by the duration and magnitude of the ionization pulse. Mass resolutions of approximately 1:350 (FWHM) have been reported with this technique. The main limitation of this technique is the modest increase in mass resolution. FIG. 2B illustrates the analogous circuit for FIG. 2A, wherein the inherent capacitances 218 and 220 between the first counter electrode 210 and the specimen 200, and between the second counter electrode 214 and both of the first counter electrode 210 and the specimen 200, are depicted; these capacitances will be relevant to later discussion.

It would therefore be useful to have available some means for attaining better mass resolution in atom probes while reducing or eliminating the difficulties involved with the prior mass resolution enhancement techniques.

SUMMARY OF THE INVENTION

The invention, which is defined by the claims set forth at the end of this document, is directed to devices and methods which at least partially alleviate the aforementioned problems. A basic understanding of some of the preferred features of the invention can be attained from a review of the following brief summary of the invention, with more details being provided elsewhere in this document.

In an atom probe (or some other mass spectrometer) wherein a specimen is subjected to ionizing pulses which induce field evaporation of ions from the specimen, energy compensation is performed by subjecting the evaporated ions to corrective pulses which are synchronized with the ionizing pulses. These corrective pulses have a timing and magnitude such that they reduce the velocity distribution of the evaporated ions, i.e., evaporated ions of a given mass-to-charge ratio (and thus of a given species) will not have as wide of a range of velocities as they depart the specimen. A preferred arrangement is to provide each corrective pulse from a counter electrode in response to a corresponding one of the ionizing pulses. An exemplary version of this arrangement is depicted in FIG. 3A, wherein the specimen 300 is subjected to an ionizing pulse from a first counter electrode 310, and the corrective pulse is then delivered by a second counter electrode 314. Other arrangements are possible, e.g., the first counter electrode 310 may be eliminated and the ionizing pulses may be delivered by other means (such as by subjecting the specimen 300 itself to ionizing voltage and/or laser pulses), with the counter electrode 314 then supplying the corresponding corrective pulses. FIG. 3C then depicts a plot of an exemplary ionizing pulse (in solid lines) and a corresponding corrective pulse (in dashed lines), showing the corrective pulse lagging the ionizing pulse in such a manner that any late-departing ions in FIG. 1 have their velocities increased, thereby reducing Δv and effectively flattening the top of the velocity curve 104 in FIG. 1. The amplitudes of the corrective pulses must be sufficient to have an appreciable effect on the velocities of the ions, and thus it is preferred that the corrective pulses have amplitudes which are at least 10% of, and more preferably at least 50% of, their corresponding ionization pulses.

The corrective pulse may be generated on the counter electrode by a passive component, i.e., one or more resistors, capacitors, inductors, diodes, and/or other components which do not require an independent power supply. Such an arrangement is shown in FIG. 3A, wherein a passive component 322 is placed between the second counter electrode 314 and ground 316 (or between the second counter electrode 314 and some other source of constant voltage). In this case, the corrective pulse may be passively generated on the second counter electrode 314 by the ionizing pulse on the first counter electrode 310 owing to the capacitive coupling between the first and second electrodes 310 and 314. The passive component 322 preferably has adjustable value so that the form of the corrective pulse can be varied to some extent, thereby allowing corrective pulses of different shapes and amplitudes to be used under different conditions.

Alternatively (or additionally), the corrective pulse may be generated on the counter electrode by an active component, i.e., some component such as a pulser, an amplifier, and/or a biased diode which requires an independent power supply to generate the corrective pulse in response to an ionizing pulse. In this arrangement, exemplified in FIG. 4A, the active component (shown at 422) receives a control signal from the first counter electrode 410 (or from any other source of ionizing pulses) when the ionizing pulse is delivered, and it generates a corresponding corrective pulse on the counter electrode 414. As with the passive component 322 discussed above, the active component 422 is preferably tunable/programmable so that the form of the corrective pulse may be altered to attain desired effects on the velocity distribution.

Further advantages, features, and objects of the invention will be apparent from the following detailed description of the invention in conjunction with the associated drawings.

DETAILED DESCRIPTION OF PREFERRED VERSIONS OF THE INVENTION

Figure 1:
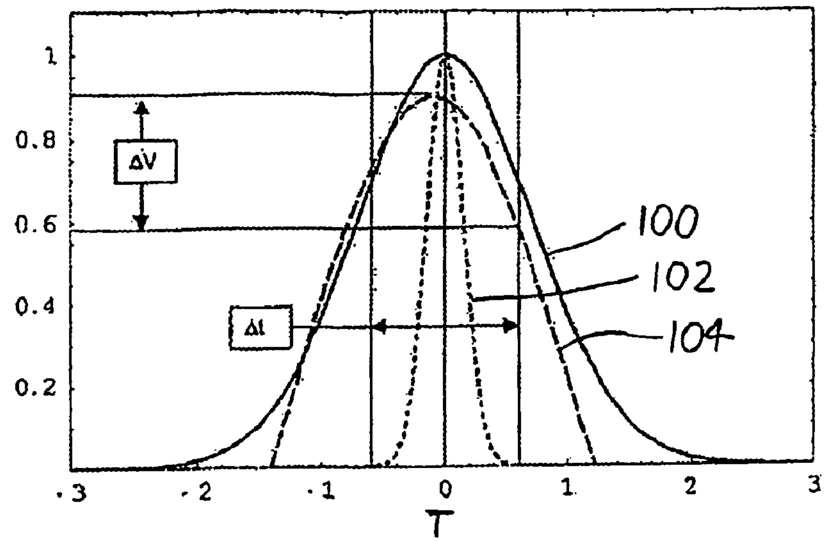
FIG. 1 is a plot schematically illustrating the voltage of an idealized ionization pulse 100 in an atom probe, the probability distribution 102 of a departing ion, and the velocity distribution 104 of departing ions, over an interval of time surrounding the pulse 100.

The invention provides an energy compensation arrangement for increasing the mass resolution in atom probes and other mass spectrometers which employ a pulsed ionization mechanism. Looking to the exemplary version of the invention depicted in FIG. 3A, a specimen 300 is shown in an atom probe chamber 302 spaced from a detector 304, with the specimen 300 being connected to a source 306 of standing voltage. A first counter electrode 310 is connected to an ionization pulser 312, and a second counter electrode 314 is situated adjacently to the first between the specimen 300 and detector 304, similar to the counter electrode ion deceleration arrangement discussed above and shown in FIGS. 2A-2C. However, the second counter electrode 314 also has a pulsed voltage applied to it, with the pulse being tailored to accelerate and/or decelerate the ions 308 passing it so as to reduce the variation in time of flight discussed previously with reference to FIG. 1. For example, in the preceding discussion it was noted that for many atom probe configurations, ions leaving earlier during the ionization pulse would (usually) have a higher velocity than those leaving later. In this instance, the corrective pulse delivered to the second counter electrode 314 could be formed (e.g., synchronized with respect to the ionization pulse on the first counter electrode, and provided with some desired pulse shape and amplitude) to decelerate the early ions 308 by a greater amount than ions 308 arriving later, thereby reducing the effective spread in the ion departure times.

The amplitude and form of the corrective pulse delivered to the second counter electrode 314 can be designed to reduce the effect of the systematic variation in Δt and Δv on the measured TOF. In practice, the desired form (timing, shape and/or amplitude) of the corrective pulse can be determined by either directly measuring the TOF spread without any corrective pulsing and then forming the corrective pulse to reduce the spread during subsequent ionization pulses on the first counter electrode 310, or by using computer modeling to determine a predicted TOF spread (without corrective pulsing) and devising an appropriate form for the corrective pulse. A combination of both approaches could also be used, e.g., by using computer modeling to devise an initial corrective pulse form, and then refining it empirically after specimen ionization begins and experimental TOF data is available. Since the shape of the corrective pulse (in particular, its skewness about its peak) will depend on many variables including the spacing between the first and second counter electrodes, operational voltages, ion flight distance, and other machine/material parameters, it is preferred that the pulse shape be at least partially based on empirical data so as to achieve better improvement in mass resolution.

In practice, a simple way to generate the corrective pulse on the second counter electrode 314 is to electrically couple the ionization pulse to the second counter electrode 314. By using an appropriate combination of electronic devices (e.g. passive devices such as resistors, inductors, capacitors, diodes, etc. or combinations of these devices, or active devices such as pursers, amplifiers, biased diodes, etc. or combinations of these devices), the corrective pulse can be tailored to an appropriate form for providing reduction in TOF spread. There are limits to the possible pulse shapes that can be generated from the ionization pulse, particularly where passive coupling is used, so the optimal corrective pulse shape may not always be obtained. Nevertheless, in experimental versions of the invention, even imperfect corrective pulse shapes generated by use of passive coupling have resulted in significant increases in mass resolution (as will be discussed below).

Figure 2A:
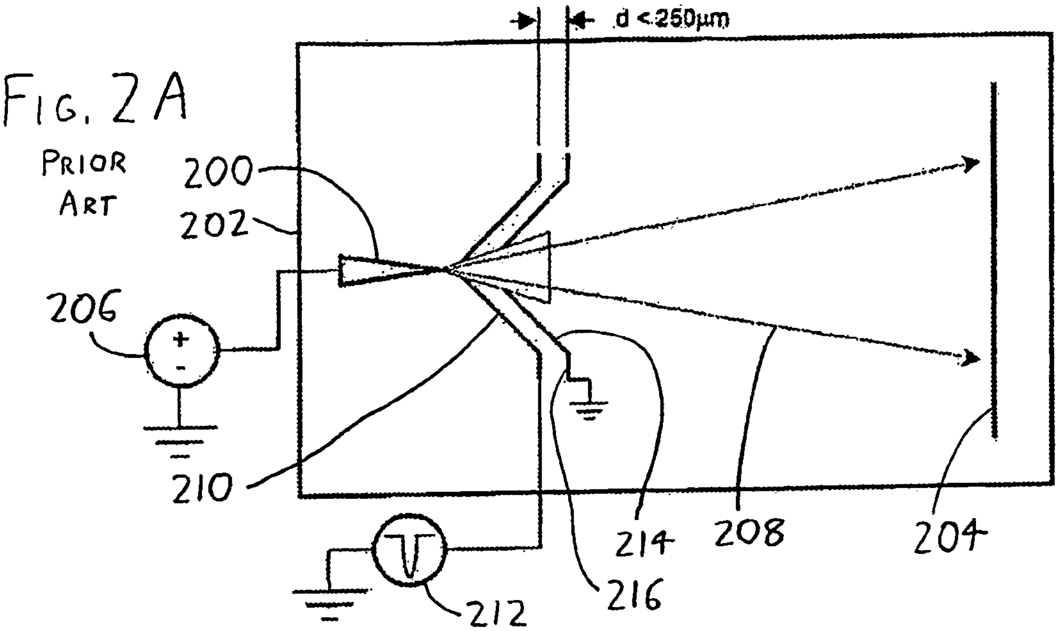
FIG. 2A PRIOR ART
FIG. 2A provides a simplified schematic illustration of an exemplary atom probe arrangement wherein a specimen 200 is subjected to ionization pulses on a first counter electrode 210 to emit ions 208 through the first electrode 210, and subsequently through a second counter electrode 214, toward a detector 204.
Figure 2B:
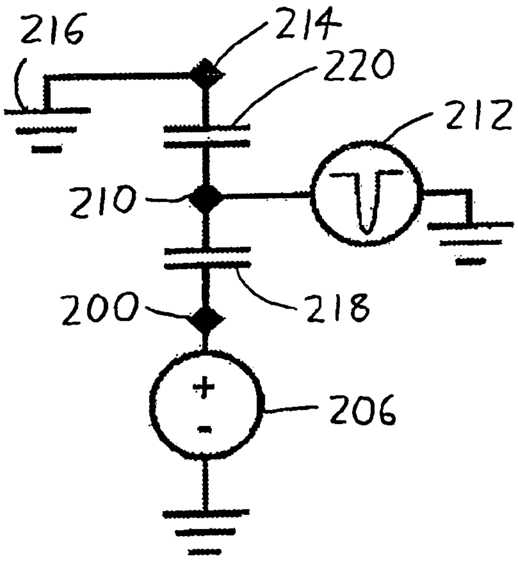
FIG. 2B PRIOR ART
FIG. 2B provides a simplified schematic circuit diagram of the arrangement of FIG. 2A.
Figure 2C:
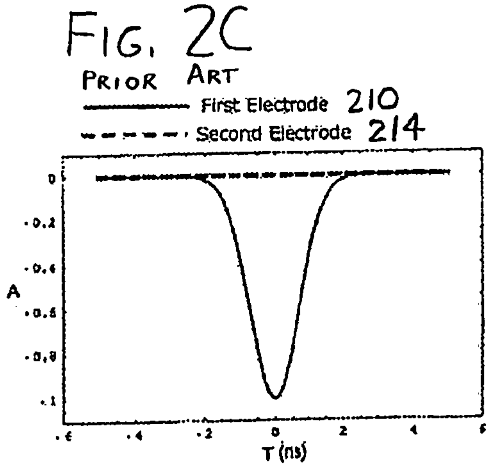
FIG. 2C PRIOR ART
FIG. 2C illustrates a conventional voltage relationship between the first counter electrode 210 and the second counter electrode 214 during the delivery of the ionizing pulse to the first electrode 210.
Figure 3A:
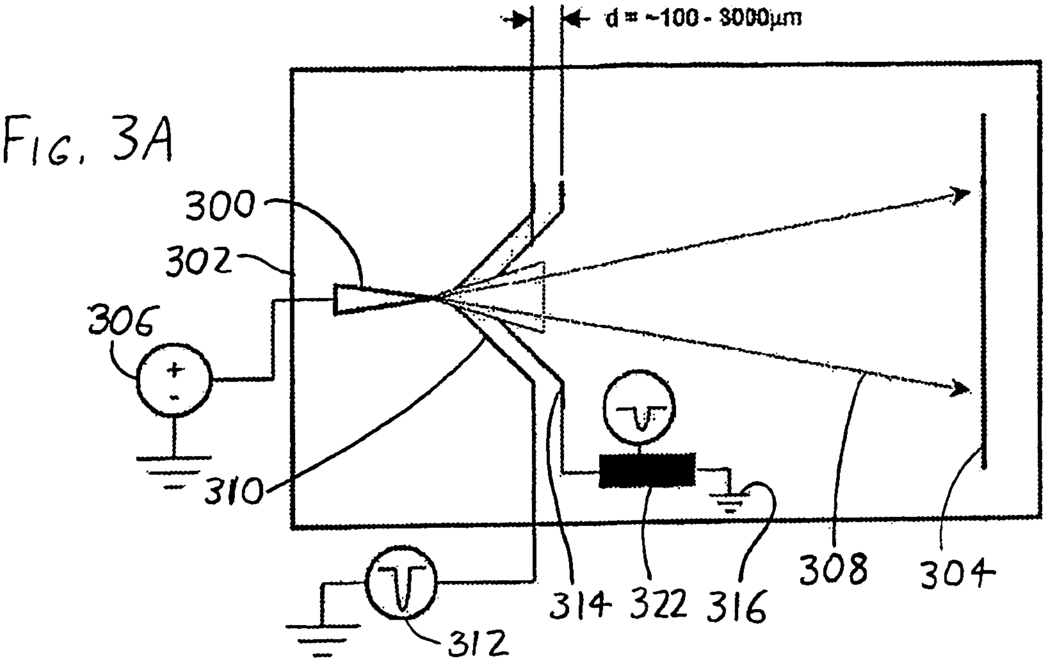
FIG. 3A provides a simplified schematic illustration of an exemplary atom probe arrangement wherein a specimen 300 is subjected to ionization pulses on a first counter electrode 310 to emit ions 308 through the first electrode 310 and through a second counter electrode 314 toward a detector 304, with the second counter electrode 314 also emitting corrective pulses generated by a passive pulse shaping device 322, and with these corrective pulses serving to adapt the velocities of "late" ions and thereby reduce the velocity distribution Δv.
Figure 3B:
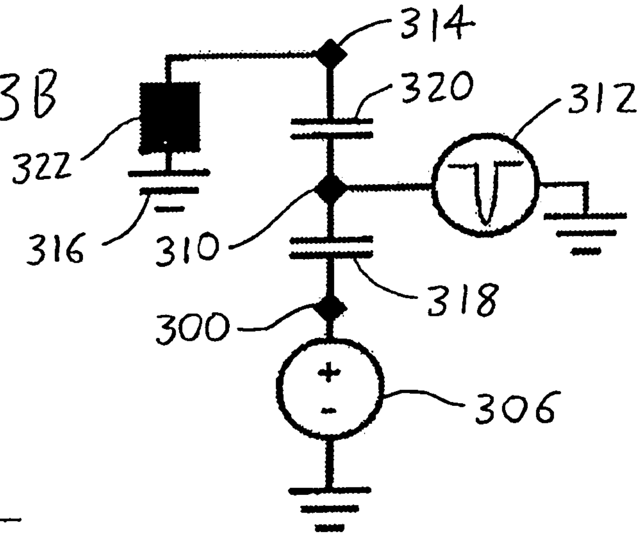
FIG. 3B provides a simplified schematic circuit diagram of the arrangement of FIG. 3A.

A particularly elegant implementation of this technique is to exploit the fact that two closely spaced counter electrodes 310 and 314 are inherently capacitively coupled (as discussed above with reference to FIG. 2), and this coupling need merely be modified to generate a corrective pulse of sufficient magnitude (and having appropriate timing, shape, etc.). FIGS. 3A and 3B illustrate an arrangement wherein the second counter electrode 314 is connected to a source 316 at ground potential (or to some other constant potential) via some passive pulse shaping element(s) 322, i.e., some resistor, inductor, capacitor, diode, or combination/network of such elements. When the ionization pulse is delivered to the first counter electrode 310, the second counter electrode 314 will experience a voltage pulse because it is capacitively coupled to the first. The values of the coupled capacitance can be changed by varying parameters such as the spacing of the two apertures, changing any material situated between the electrodes, changing the relative dimensions/coupling cross sections of the electrodes 310 and 314, etc., and the formation of the corrective pulse can be further enhanced by the installation of appropriate passive pulse shaping elements 322 (one or more of resistors, capacitors, inductors, and/or diodes), with these components preferably being situated between the second electrode 314 and ground 316 (or whatever other potential). With the choice of appropriate elements 322, the corrective pulse can (partially or wholly) adopt the desired form. The use of passive elements 322 between the second electrode 314 and ground 316 has the advantage that very little modification to the electrodes 310 and 314 (and the atom probe in general) is required, and no active components (i.e., components with power supplies and/or requiring control signals for operation) are needed.

Figure 5:
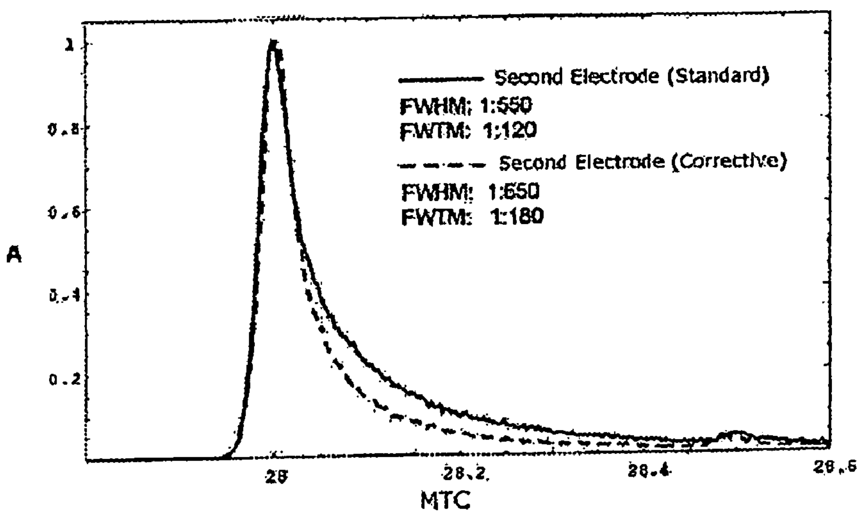
FIG. 5 illustrates the improvement in mass resolution attained by use of a second counter electrode delivering a corrective pulse (as in FIG. 3) over a conventional non-pulsed second counter electrode (as in FIG. 2).
Figure 6:
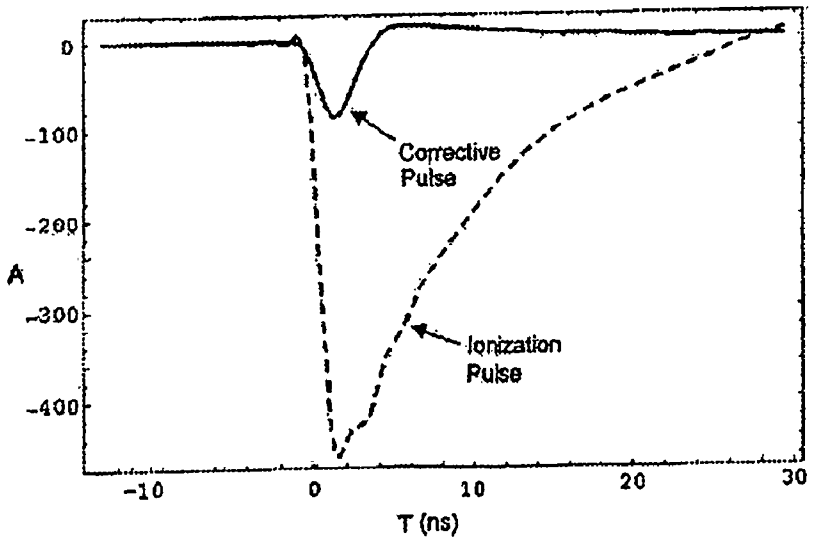
FIG. 6 illustrates an ionization pulse and a passively-generated corrective pulse created in an arrangement such as that of FIG. 3.

This approach was experimentally implemented in a LEAP atom probe (Imago Scientific Instruments, Madison, Wis., USA), wherein a 1 kohm resistor placed between the second counter electrode 314 and ground 316 increased the mass resolution by about 20%. See FIG. 5, which shows the difference in results between a standard/unpulsed second counter electrode 314 and a corrective/pulsed second electrode 314. Mass resolution was significantly improved at both the full width half max (FWHM and full width tenth max (FWTM). No active corrective pulse was applied to the second counter electrode 314, i.e., it was passively correctively pulsed via its capacitive coupling to the first counter electrode 310, and the ionization pulse and resulting corrective pulse are illustrated in FIG. 6. In another experiment, a resistor of 1 kohm and a capacitor of 10 pF were placed in series between the second counter electrode and ground, and a similar improvement in mass resolution was obtained. It should be understood that in the foregoing experiments, the inherent capacitance—which is depicted in FIG. 3B at 318 and 320, and which arises from the mount connecting the electrodes 310/314 to the ground 316 and other components—was approximately 1-3 pF, so the foregoing resistors/capacitor were effectively provided in combination with this inherent capacitance. In a conventional arrangement (e.g., one as depicted in FIGS. 2A-2C), the inherent capacitance does not provide any corrective pulse effect (as depicted in FIG. 2C), but when the passive element 322 is situated between the second electrode 314 and ground 316, the second electrode 314 is effectively buffered such that it may fluctuate with respect to ground 316 to generate a quantitatively significant corrective pulse. When a resistance is included in the passive element 322, it is believed that the resulting arrangement effectively acts as a passive differentiator (an RC differentiator), wherein the amplitude of the corrective pulse is roughly proportional to the rate of change of the ionization pulse (and to the magnitude of the resistance and/or capacitance values used). Preferred resistance values are 500 ohms or greater, and preferred capacitance values are 5 pF or greater, though other values may be used depending on the configuration and characteristics of the atom probe being used, and on the parameters under which it is operating.

Where passive pulse shaping elements 322 are used to generate the desired corrective pulse on the second counter electrode 314, it is particularly preferred that the passive shaping elements 322 be tunable (i.e., that variable resistors, capacitors, etc. be used). This is because a variety of other parameters in the atom probe will affect mass resolution—e.g., electrode 310/314 configuration and placement, distance to the detector 304, the form of the ionization pulse, etc.—and these parameters may be changed not only between different operating sessions of the atom probe, but possibly during the course of a single session. For example, it is common to adapt the form of the ionization pulse during an operating session; in particular, its voltage is generally increased as more of the specimen 300 is ionized. As another example, it is also common to adjust the distance between the electrodes 310/314 and the detector 304 between operating sessions to obtain some desired magnification, field of view, and/or nominal mass resolution (with a discussion of such adjustment being provided in WO2004/111604). Thus, the ability to adapt resistance, capacitance, diode voltage bias, etc. values between or during operating sessions can allow the corrective pulse to be appropriately modified to obtain mass resolution enhancement for whatever operating parameters (detector distance, etc.) are presently in place. Additionally, since the amount of mass resolution enhancement will also depend to some degree on the MTC ratio of the ion species being evaporated, tunable components allow a corrective pulse to be optimized for the range of MTC ratios of greatest interest.

Figure 3C:
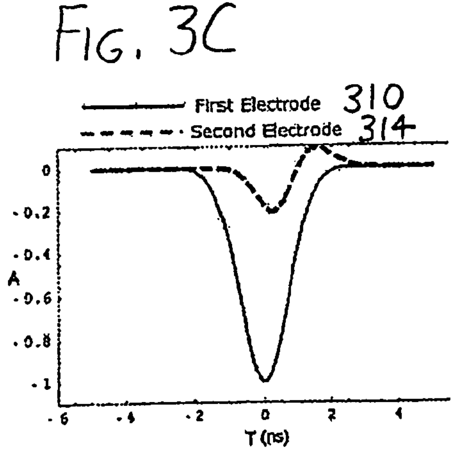
FIG. 3C illustrates an exemplary time/voltage relationship between an ionizing pulse on the first counter electrode 310 and the resulting corrective pulse on the second counter electrode 314.

As noted above and as depicted in FIG. 4, it is alternatively (or also) possible to connect the second counter electrode 414 to a dedicated pulser, amplifier, biased diode (e.g., a TRAPATT diode, see Baker, R. J., "Time Domain Operation of the TRAPATT Diode for Picosecond-Kilovolt Pulse Generation," Rev. Sci. Instrum. 65 (10) (October 1994)), or other active pulse shaping device 422 which creates an appropriate corrective pulse. In practice, the ionization pulser 412 on the first counter electrode 410 would provide a trigger signal to the corrective pulser 422 on the second counter electrode 414, with a trigger communication line being depicted in FIG. 4A at 424, so that the corrective pulse is delivered at the desired time, and with the desired shape and amplitude. While this approach will generally be more expensive than the use of solely passive components, it has the benefit of being more flexible since a pulser or other active pulse shaping components 422 can usually be controlled to create a wider range of corrective pulse forms than the range that can be delivered by use of passive components alone (even where such components are tunable). For example, whereas the corrective pulse delivered by a passive component such as a capacitor or RC network will generally have a limited amplitude—one dependent on the amplitude of the ionizing pulse—the corrective pulse delivered by an amplitude-controllable pulser can be varied to virtually any desired level (limited only by the power output of the pulser). Further, the corrective pulse forms are more "controlled" in that passive components 322 may create corrective pulses with undesirable tails (or tail shapes), trailing oscillations, or other unwanted characteristics, whereas active components 422 need not do so, as can be seen from a comparison of FIGS. 3C and 4C. Additionally, as noted above with respect to the use of tunable passive components, the corrective pulse can be modified by active pulse shaping components 422 during operation of the atom probe to maintain optimal mass resolution over a wide range of operating parameters.

It should be understood that the various preferred versions of the invention described above are provided to illustrate different possible features of the invention and the varying ways in which these features may be combined. Apart from combining the different features of the foregoing versions in varying ways, other modifications are also considered to be within the scope of the invention. Following is an exemplary list of such modifications.

Figure 4A:
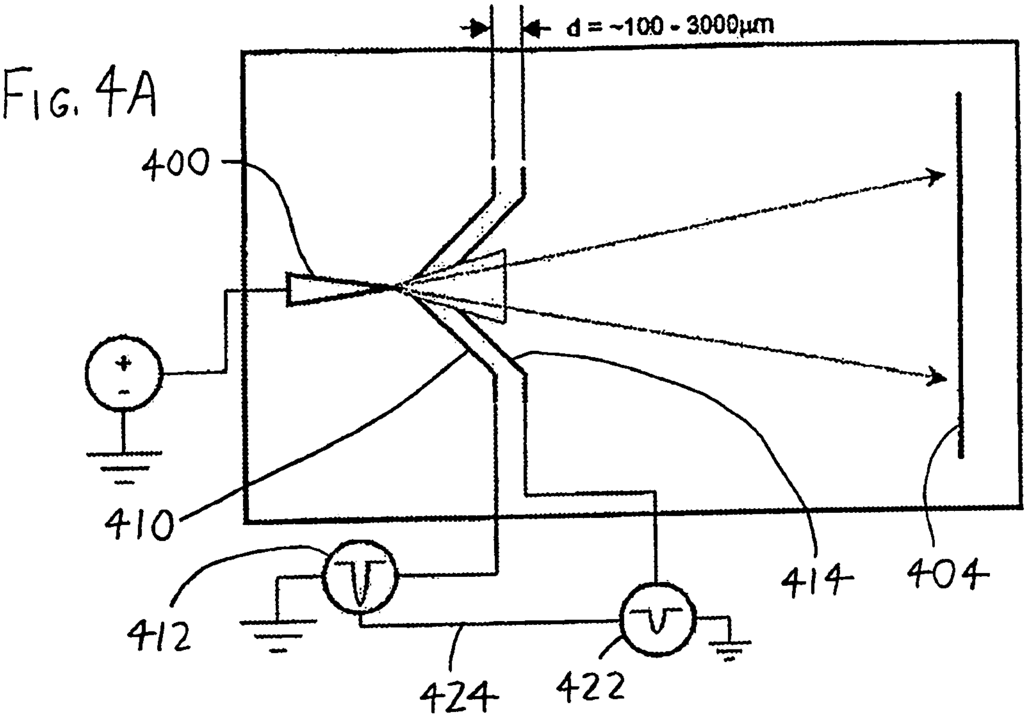
FIG. 4A provides a simplified schematic illustration of an exemplary atom probe arrangement wherein a specimen 400 is subjected to ionization pulses on a first counter electrode 410 to emit ions 408 through the first electrode 410 and through a second counter electrode 414 toward a detector 404, with the second counter electrode 414 also emitting corrective pulses generated by an active pulse shaping device 422 (with this device 422 being triggered by the ionization pulser 412).
Figure 4B:
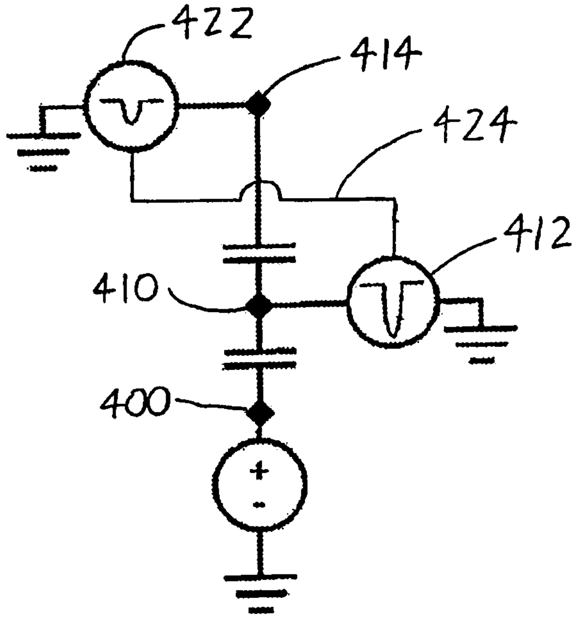
FIG. 4B provides a simplified schematic circuit diagram of the arrangement of FIG. 4A.
Figure 4C:
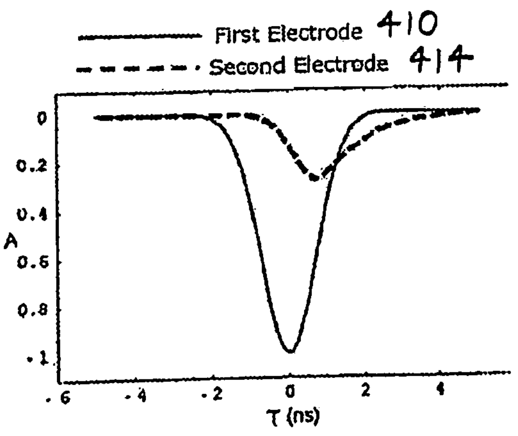
FIG. 4C illustrates an exemplary time/voltage relationship between an ionizing pulse on the first counter electrode 410 and the resulting corrective pulse on the second counter electrode 414.

First, it should be understood that the correctively pulsed counter electrode may take a wide variety of forms, such as an apertured plate, a funnel-like member (as depicted in FIGS. 2A, 3A, and 4A), a bowl-like member, a tube or other passage (which might converge or diverge over a portion of its length), or other forms. Other forms such as branched/furcated members (or other members which are not symmetric about the ion flight cone), or meshed members, may also be possible, though symmetric members are generally preferred because they generate more uniform and predictable electric fields. In short, the correctively pulsed counter electrode may adopt virtually any form so long as it generates a useful corrective pulse.

Second, it is also possible to provide additional counter electrodes—a third, fourth, and so on—which can also provide corrective pulses when desired, with the corrective pulses between the different electrodes cooperating to provide the desired mass resolution enhancement.

Third, recall from the prior discussion that some prior atom probes provided ionization pulses not to a counter electrode, but to the specimen itself (via the specimen mount). The corrective pulses of the invention could be generated from any source of ionizing pulses, whether the ionizing pulses are provided on a first counter electrode, on the specimen, or on both the specimen and the counter electrode. To illustrate, the invention could be utilized in a system such as that described in International Application PCT/US2004027062, wherein ionization pulses are delivered via a laser. In this case, only a single counter electrode is needed (though more could be present), and it could bear a corrective pulse which is synchronized with respect to the laser pulse delivery.

Fourth, the invention may utilize corrective pulses which have timing dependent on ionization pulses, but which otherwise have shapes and amplitudes which are independent of the ionization pulses. As an example, the pulse shaping device 422 could always emit a corrective pulse having the same size and shape, with the corrective pulse simply being synchronized with respect to the ionization pulse to adjust the velocities of ions having late evaporation. While such corrective pulses may be less than optimal, they should nonetheless provide some improvement in mass resolution.

Fifth, as discussed above, the corrective pulses may be generated by use of a passive component (including resistors, capacitors, inductors, diodes, etc. or some combination of these components), an active component (including pulsers, amplifiers, biased diodes, etc. or some combination of these components), or a combination of active and passive components. It should be understood that the location of these components may vary, i.e., they may be in the vacuum chamber of the atom probe, or remote from the counter electrode with their corrective pulses provided by some feedthrough connection (preferably one which is tailored to provide beneficial impedance).

The invention is not intended to be limited to the preferred versions of the invention described above, but rather is intended to be limited only by the claims set out below. Thus, the invention encompasses all different versions that fall literally or equivalently within the scope of these claims.

What is claimed is:

1. An atom probe wherein:

a. a specimen is subjected to ionizing pulses which induce field evaporation of ions from the specimen, and b. the atom probe includes a counter electrode wherein:

(1) the counter electrode does not bear the ionizing pulses, and (2) the counter electrode bears corrective pulses, each corrective pulse having a timing and magnitude sufficient to reduce the velocity distribution of the evaporated ions.

2. The atom probe of claim 1 wherein:

a. the counter electrode bearing the corrective pulses is a second counter electrode, and b. the atom probe further comprises a first counter electrode which bears the ionizing pulses.

3. The atom probe of claim 2:

a. wherein the second counter electrode is connected to a source of constant voltage, and b. further comprising a passive component between the second counter electrode and the source of constant voltage, the passive component including at least one of:

(1) a resistor, (2) a capacitor, (3) an inductor, and (4) a diode.

4. The atom probe of claim 3 wherein the passive component has at least one of adjustable resistance, adjustable capacitance, and adjustable inductance.

5. The atom probe of claim 2:
a. wherein the second counter electrode is connected to a source of constant voltage, and
b. further comprising a capacitance of at least 5 pF between the second counter electrode and the source of constant voltage.

6. The atom probe of claim 2 further comprising an active component which:
a. receives a control signal dependent on the ionizing pulses;
b. generates the corrective pulses in response to the control signal; and
c. communicates the corrective pulses to the second counter electrode.

7. The atom probe of claim 6 wherein the active component includes at least one of:
a. a pulser;
b. an amplifier; and
c. a biased diode.

8. The atom probe of claim 6 wherein the active component is programmable, whereby the form of the corrective pulse in response to a given control signal can be varied.

9. The atom probe of claim 1 wherein:
a. the counter electrode bearing the corrective pulses is a second counter electrode;
b. the atom probe further comprises a first counter electrode which bears the ionizing pulses; and
c. the corrective pulses are each generated by a respective one of the ionizing pulses.

10. The atom probe of claim 1 wherein each corrective pulse is provided from the counter electrode in response to a corresponding one of the ionizing pulses.

11. The atom probe of claim 1 wherein each corrective pulse:
a. occurs in synchronization with an ionizing pulse, and
b. has a peak voltage which is at least 10% of the peak voltage of the ionizing pulse.

12. The atom probe of claim 11 wherein each corrective pulse has a peak voltage which lags the peak voltage of the ionizing pulse.

13. The atom probe of claim 1 wherein each corrective pulse:
a. occurs in synchronization with an ionizing pulse, and
b. has a peak voltage which lags the peak voltage of the ionizing pulse.

14. The atom probe of claim 13 wherein each corrective pulse has a peak voltage which is at least 10% of the peak voltage of the ionizing pulse.

15. The atom probe of claim 1 wherein each corrective pulse has a peak voltage which is at least 50% of the peak voltage of the ionizing pulse.

16. An atom probe wherein:
a. a specimen is subjected to ionizing pulses which induce field evaporation of ions from the specimen, and
b. the atom probe includes a counter electrode wherein:
(1) the counter electrode does not bear the ionizing pulses, and
(2) the counter electrode bears corrective pulses, each corrective pulse having a peak voltage which:
(a) occurs in synchronization with a corresponding ionizing pulse;
(b) has a magnitude of at least 10% of the magnitude of the peak voltage of its corresponding ionizing pulse, and
(c) lags the peak voltage of its corresponding ionizing pulse.

17. The atom probe of claim 16 wherein:
a. the counter electrode bearing the corrective pulses is a second counter electrode, and
b. the atom probe further comprises a first counter electrode which bears the ionizing pulses.

18. The atom probe of claim 17 wherein the second counter electrode is in electrical communication with at least one of:
a. a resistor,
b. a capacitor,
c. an inductor, and
d. a diode.

19. The atom probe of claim 17:
a. wherein the second counter electrode is connected to a source of constant voltage, and
b. further comprising a passive component between the second counter electrode and the source of constant voltage, the passive component including at least one of:
(1) a resistor,
(2) a capacitor,
(3) an inductor, and
(4) a diode.

20. The atom probe of claim 17 further comprising an active component which:
a. receives a control signal dependent on the ionizing pulses;
b. has a power source independent of the ionizing pulses;
c. generates the corrective pulses from the power source in response to the control signal; and
d. communicates the corrective pulses to the second counter electrode.

21. The atom probe of claim 20 wherein the active component includes at least one of:
a. a pulser,
b. an amplifier, and
c. a biased diode.

22. An atom probe wherein:
a. a specimen is subjected to ionizing pulses which induce field evaporation of ions from the specimen, and
b. the ions, subsequent to being evaporated from the specimen, are subjected to corrective pulses which:
(1) are synchronized with the ionizing pulses, and
(2) reduce the velocity distribution of the evaporated ions.

23. The atom probe of claim 22 wherein each corrective pulse has a peak voltage which:
a. lags, and
b. has a magnitude less than,
the peak voltage of a corresponding ionization pulse.

24. The atom probe of claim 22 comprising a counter electrode spaced from the specimen, wherein the counter electrode bears the corrective pulses.

25. The atom probe of claim 24 wherein:
a. the counter electrode bearing the corrective pulses is a second counter electrode, and
b. the atom probe further comprises a first counter electrode situated between the specimen and the second counter electrode.

26. The atom probe of claim 22 wherein the corrective pulse is at least partially generated by a passive component, the passive component including at least one of:
a. a resistor,
b. a capacitor,
c. an inductor, and
d. a diode.

27. The atom probe of claim 22 wherein the corrective pulse is at least partially generated by an active component, the active component including at least one of:
a. a pulser,
b. an amplifier, and
c. a biased diode.

* * * * *